United States Patent Office 2,712,029
Patented June 28, 1955

2,712,029
MONOAMIDES OF TRIHALOMETHANEPHOSPHONIC ACID MONOESTERS

John L. Van Winkle, San Lorenzo, Edward R. Bell, Concord, and Rupert C. Morris, Berkeley, Calif., assignors to Shell Development Company, Emeryville, Calif., a corporation of Delaware No Drawing. Application July 20, 1953,
Serial No. 369,232

18 Claims. (Cl. 260—461)

This invention relates to novel organic compounds of phosphorus. More particularly, it relates to amides of dibasic acids of pentavalent phosphorus having directly substituted on the pentavalent phosphorus a trihalomethyl group as new compounds. Also, this invention pertains to a novel method for the preparation of amides of vinyl trihalomethanephosphonates.

In accordance with the present invention, there are provided the monoamides of organic monoesters of dibasic acids of pentavalent phosphorus having directly substituted on pentavalent phosphorus a trihalomethyl group. The dibasic acids of pentavalent phosphorus are generally referred to as phosphonic acids and correspond to the general formula:

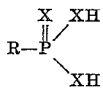

wherein R represents an organic radical that is bonded to the phosphorus atom by a carbon-to-phosphorus bond, and each X represents a non-metal of the chalcogen group. Thus, the novel compounds of the present invention can also be defined as being the monoamides of trihalomethanephosphonic acid monoesters, which compounds have the following general structural formula:

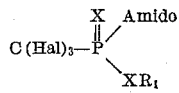

wherein Hal represents halogen, each X represents an atom of a non-metal chalcogen element, i. e., oxygen, sulfur, or selenium, Amido represents an amido radical, that is, the residue of ammonia or an organic amine, and $R_1$ represents an organic radical.

In a preferred embodiment of the invention, Hal represents chlorine, X represents oxygen, Amido is the residue of an aliphatic amine, preferably an aliphatic hydrocarbyl amine, and $R_1$ is a hydrocarbon group, preferably an aliphatic hydrocarbon group. In another embodiment of the invention, Hal represents chlorine, X represents oxygen, Amido is the residue of an alkyl amine, and $R_1$ is a vinyl radical, that is, an alpha, beta-ethylenically unsaturated radical having at least one beta hydrogen atom.

Also, in accordance with the invention, the novel amidophosphonate esters of the present invention can be prepared by the reaction of a monoamide of an organic diester of a tribasic acid of trivalent phosphorus, that is, a monoamidophosphite organic diester, with at least the stoichiometric equivalent of a carbon tetrahalide. The temperature at which the reaction can be carried out can vary within a very wide range, depending on the specific reactants employed. Since many of the reactants which can be employed are violently reactive, it is generally advisable to initiate the reaction at a relatively low temperature, for example, at a temperature of from about −10° C. to about 100° C. After the reaction has begun, heat can be applied if necessary to complete the reaction, temperatures up to even 200° C. being applicable. The reaction mixture is then stripped to remove by-product organic halide and any excess carbon tetrahalide, leaving as bottom product, the present novel amidophosphonate esters. As the carbon tetrahalide there can be used carbon tetrachloride, carbon tetrabromide, carbon tetraiodide or mixed tetrahalides, such as dibromodichloromethane. The halogens of the carbon tetrahalide thus may be bromine, iodine, and/or chlorine. Carbon tetrachloride is the preferred carbon tetrahalide.

The amidophosphite diesters which are the starting materials in the preparation of the present novel compounds are usually prepared by either of two methods. One method comprises reacting a chlorophosphite diester with ammonia or an amine, thereby forming the amidophosphite diester and hydrogen chloride. The second method comprises first reacting an amine with phosphorus trichloride to obtain an amidodichlorophosphite, and then reacting the resulting amidodichlorophosphite with about two molar equivalents of an alkali metal alcoholate, such as sodium alcoholate, thereby forming the corresponding amidophosphite diester and sodium chloride. In the second method described, it is necessary that the alkali metal alcoholate employed be free of any free alcohol, since the presence of free alcohol in the reaction will result in the hydrolyzing of the P—Cl group to a P—OH group.

According to a specific embodiment of the invention, amides of vinyl trihalomethane phosphonates are prepared by reacting a P-aminophospholane, such as a 2-amino-1,3,2-dioxaphospholane, with a carbon tetrahalide. This particular reaction is generally carried out at an elevated temperature of from about 125° C. to about 250° C., and preferably from about 145° C. to about 160° C., and for a period of time of at least about one-half hour.

The 2-amino-1,3,2-dioxaphospholanes, from which the present amides of vinyl trihalomethanephosphonates are prepared, have the following general structural formula:

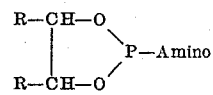

wherein R is hydrogen or an organic radical and Amino represents an amino group. They are usually prepared by reacting an ethylene glycol with phosphorus trichloride, preferably in an inert solvent, at a temperature of from about 10° C. to about 25° C. to obtain a 2-chloro-1,3,2-dioxaphospholane which is then reacted, in the presence of an inert solvent, with an amine at a temperature of about 0° C.

The reaction between the P-amino phospholanes and carbon tetrahalides is believed to be a new type of reaction. While we do not desire to restrict the invention according to any theory, it appears that the reaction can be described by the following equation, in which 2-dimethylamino-1,3,2-dioxaphospholane and carbon tetrachloride are shown as illustrative reactants only:

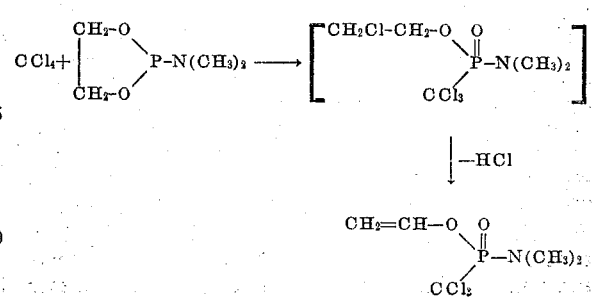

In the more general case, the reaction thus appears to correspond to the equation

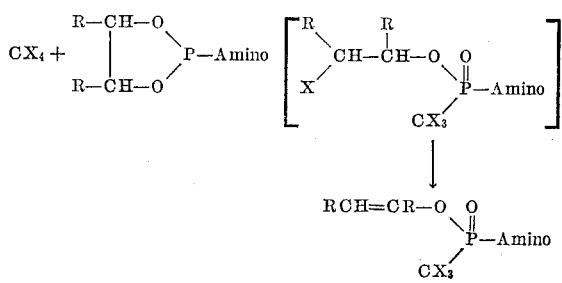

in which each X represents an acidogenic halogen, that is, bromine, chlorine, or iodine, and R and Amino have the significance defined hereinabove.

Suitable amines which can be employed in the preparation of the novel amides of the present invention by the above-described method include, for example, the aliphatic primary amines, such as methylamine, ethylamine, propylamine, butylamine, amylamine, n-octylamine, ethanolamine, ethylene diamines, 2-ethylhexylamine, t-butylamine, 1,1,2-trimethylpropylamine, 1,3-dimethylbutylamine, 4-methylpentylamine, 3,3,5-trimethylhexylamine, cetylamine, tetradecylamine, hexadecylamine, 2,2,4-trimethylpentylamine, 2,2,4,4,6-pentamethylheptylamine, dodecylamine, octadecylamine, and higher alkyl primary amines containing up to 20 or more carbon atoms; alicyclic amines such as, cyclohexylamine, 3,3,5-trimethylcyclohexylamine, cyclopentylamine, 4-phenylcyclohexylamine, methylcyclohexylamines, and homologs and analogs thereof; and aromatic amines, such as aniline, naphthylamine, p-phenylenediamine, 3,5-dimethylaniline, 2,3,6-triethylaniline, phenanthrylamines, mixed coal tar bases, and homologous and analogous mono- and polycyclic aromatics; and also unsaturated primary amines, such as allylamine, propargylamine, methallylamine, cyclohexenylamine, oleylamine, linoleylamine, and homologs and analogs thereof, and polyamines, such as, diethylanetriamine, trimethylenediamine, 2-hydroxy-1,3-diamino propane, diamonobenzene, and diacetonediamine. Secondary amines which are suitable include, for example, the dialkyl and substituted dialkyl amines, such as, dimethylamine, diisopropylamine, dibutylamine, N-methylbutylamine, diamylamine, dihexylamine, di-2-ethylhexylamine, dioctylamine, di-2,2,4-trimethylpentylamine, di-3,5,5-trimethylhexylamine, N-ethylcetylamine, didodecylamine, ditetradecylamine, diethanolamine, diricinoleylamine. N-isopropylstearylamine, N-butyltricinoleylamine, N-isoamylhexylamine, N-ethyloctylamine, dioctadecylamine, and their homologs and analogs; the secondary cycloalkyl amines, such as, dicyclohexylamine, N-methylcyclohexylamine, dicyclopentylamine, N-octylcyclohexylamine, N-octyl-3,5,5-trimethylcyclohexylamine, and their homologs and analogs; the secondary aromatic amines, such as, N-methylaniline, diphenylamine, dibenzylamine, N-octylbenzylamine, N-octylphenylamine, N-butyl-p-methoxyaniline, N-cyclohexylaniline, N-2-ethylhexylaniline, N-octylbiphenylamine, dinaphthylamine, and their homologs and analogs; and unsaturated secondary amines, such as diallylamine, N-ethylallylamine, N-octylallylamine, dioleylamine, N-isopropyloleylamine, N-methyl-3,3,5-trimethyl-5-cyclohexenylamine, N-amyllinoleylamine, N-phenylallylamine, N-methyl-propargylamine, N-(p-chlorobenzyl)allylamine, and their homologs and analogs. Heterocyclic amines, such as, piperidine, 2,2,4,6-tetramethylpiperidine, morpholine, thiamorpholine, 2-aminopyrimidine, 2-aminopyridine, and the like, can also be used. The preferred amines are the aliphatic amines, and particularly the aliphatic hydrocarbyl amines, which have a total of not more than about 40 carbon atoms. Mono- and dialkyl amines in which the alkyl group, that is, each alkyl group, contains from 1 to 20 carbon atoms are most suitable.

The ester-forming radical ($R_1$) in the novel amidophosphonate esters of the present invention can be any organic radical, preferably a hydrocarbon radical, and can be either aliphatic, aromatic, or cycloaliphatic. $R_1$ is preferably an aliphatic hydrocarbon radical, either saturated or unsaturated, of from 1 to 20 carbon atoms. Of the unsaturated aliphatic radicals, the vinyl radicals, that is, alpha, beta-ethylenically unsaturated radicals having at least one beta hydrogen atom, are preferred.

Representative examples of the novel amides of the present invention include the following:

Methyl N-methylamidotrichloromethanephosphonate
Ethyl N,N-dimethylamidotrichloromethanephosphonate
Ethyl N,N - diisopropylamidotrichloromethanephosphonate
Isobutyl anilidotrichloromethanephosphonate
Butyl N,N - diisopropylamidotrichloromethanephosphonate
Butyl N,N-diphenylamidotrichloromethanephosphonate
Propyl N,N - bis(2 - ethylhexyl)amidotrichloromethanephosphonate
Phenyl N-butylamidotrichloromethanephosphonate
Octyl N,N-dicyclohexylamidotrichloromethanephosphonate
Cyclohexyl N-ethylamidotrichloromethanephosphonate
Benzyl N-hexylamidotrichloromethanephosphonate
2-methylcyclohexyl N,N-bis(2-ethylhexyl)amidotrichloromethanephosphonate
Decyl N,N-bis(3,5,5-trimethylhexyl)amidotrichloromethanephosphonate
Butyl N-ethanolamidotrichloromethanephosphonate
Cyclopentyl N,N-dimethylamidotrichloromethanephosphonate
Isobutyl N-isoamyl N,-hexylamidotrichloromethanephosphonate
2-ethylhexyl N,N-didodecylamidotrichloromethanephosphonate
Phenyl N,N-dicetylamidotrichloromethanephosphonate
Amyl N - 3,5,5 - trimethylcyclohexylamidotrichloromethanephosphonate
Hexadecyl N,N-bis(2-ethylhexyl)amidotrichloromethanephosphonate
Isobutyl N-methallylamidotrichloromethanephosphonate
Octadecyl N,N-diisopropylamidotrichloromethanephosphonate
Tetradecyl N,N-dimethylamidotrichloromethanephosphonate
Cetyl N-methyl,N-isopropylamidotrichloromethanephosphonate
Vinyl N,N-dimethylamidotrichloromethanephosphonate
Vinyl N,N-bis(2-ethylhexyl)amidotrichloromethanephosphonate
alpha - Methylvinyl N - isopropylamidotrichloromethanephosphonate
Vinyl N,N-diphenylamidotrichloromethanephosphonate
1-propenyl N,N - dimethylamidotrichloromethanephosphonate
1 - methyl - 1 - propenyl N - 2 - ethylhexylamidotrichloromethanephosphonate
3 - methyl - 1 - butenyl N,N - diisopropylamidotrichloromethanephosphonate
alpha - Ethylvinyl N,N - dibutylamidotrichloromethanephosphonate
Vinyl N,N-dicetylamidotrichloromethanephosphonate
Vinyl N - hexyl,N - methylamidotrichloromethanephosphonate
1 - butenyl N,N - diethylamidotrichloromethanephosphonate
1 - ethyl - 1 - propenyl N - cyclohexylamidotrichloromethanephosphonate
Styryl N,N-diisopropylamidotrichloromethanephosphonate 3 - ethyl - 1 - butenyl N,N - dipropylamidotrichloromethanephosphonate
1-octenyl N-isobutylamidotrichloromethanephosphonate
1-decenyl N-methylamidotrichloromethanephosphonate
4 - methyl - 1 - pentenyl N,N - bis(3,5,5 - trimethylhexyl)-amidotrichloromethanephosphonate
Vinyl N,N-ditetradecylamidotrichloromethanephosphonate and the corresponding tribromomethane- and triiodomethanephosphonates.

The novel compounds of this invention are useful for imparting extreme pressure properties to various industrial oils such as gear oils, cutting oils, drawing oils, diesel lubricating oils, aircraft turbo lubricants, automotive lubricating oils, and the like. The present compounds are suitable for addition to both hydrocarbon lubricating oils and synthetic oils such as polymers and copolymers of alkylene glycols and alkylene oxides, organic esters, e. g., 2-ethyl-hexyl sebacate, and the like. Solutions thereof in the same or lighter vehicles are valuable as cutting oils or ingredients of cutting oils, and to this end there may be employed as the vehicle, light naphthas, kerosene, aromatic solvents, and the like, as well as the more viscous or heavier oils. Such cutting oils may be employed as emulsions in water. The amides of the present invention are also useful as additives to hydraulic fluids, for example, phosphonate ester-base hydraulic fluids, and synthetic carboxylic acid ester-base hydraulic fluid wherein they serve to prolong the life of mechanical pumps and other equipment employed in or for transmission of power by means of such fluids. The compounds of this invention include biologically active compounds which are useful as insecticides, fungicides, and the like. The vinyl amidotrihalomethane phosphonates of the present invention can be polymerized to form polymeric vinyl amidophosphonates.

The following examples serve to illustrate the novel amides of the present invention and their preparation. It will be appreciated that the following examples are presented with the intent to illustrate rather than to limit the invention as it is defined in the hereto appended claims.

*Example I.—n-Butyl N,N-diisopropylamidotrichloromethanephosphonate*

Dibutyl diisopropylamidophosphite was prepared by reacting diisopropyl amine with phosphorus trichloride, thereby obtaining diisopropylamidodichlorophosphite which was then reacted with sodium n-butoxide. The resulting di-n-butyl N,N-diisopropylamidophosphite was added slowly, over a period of about one hour and with stirring, to excess carbon tetrachloride. The temperature of the reaction mixture was 0° C. Stirring was continued at 0° C. for about 1 hour, after which the mixture was allowed to warm overnight. The warmed mixture was refluxed for 12 hours and then stripped to 130° C., kettle temperature, under a pressure of about 1 to 2 mm. The bottoms were passed through a molecular still operating with the thimble at 76° C. The distillate had a refractive index, $n_D^{20}$, of 1.4730. Analyses: Found, 49.9% carbon, 7.3% hydrogen, 4.3% nitrogen, 10.6% phosphorus; calculated, 39% carbon, 6.8% hydrogen, 4.13% nitrogen, 9.15% phosphorus, all percentages being by weight.

*Example II.—Vinyl N,N-bis(2-ethylhexyl)amidotrichloromethanephosphonate*

A. PREPARATION OF 2-N,N-BIS(2-ETHYLHEXYL)-AMINO-1,3,2-DIOXAPHOSPHOLANE

Ethylene glycol was added with stirring, over a period of 45 minutes, to a methylene chloride solution of an equimolar amount of phosphorus trichloride. The reaction temperature was 10°–21° C. The reaction mixture was topped at 50° C. at about 150–200 mm. pressure, and the residue was Claisen distilled to obtain as product 2-chloro-1,3,2-dioxaphospholane. The resulting product was dissolved in ether and added to an ether solution of an equimolar amount of bis(2-ethylhexyl)amine and about 3 moles of trimethylamine (as HCl acceptor). The reaction mixture was allowed to settle at 0°–5° C. for 2 hours and was then filtered to remove solid trimethylammoniumchloride. The liquid phase was flashed to remove ether and then topped at 100° C. at 150–200 mm. pressure, obtaining as product 2-N,N-bis(2-ethylhexyl)-amino-1,3,2-dioxapholane.

B. PREPARATION OF VINYL N,N-BIS(2-ETHYLHEXYL) AMIDOTRICHLOROMETHANEPHOSPHONATE

2-N,N-bis(2 - ethylhexyl)amino - 1,3,2 - dioxaphospholane was heated to 150° C., and an equimolar amount of carbon tetrachloride was slowly added thereto. The addition of carbon tetrachloride took about 2 hours. The mixture was topped at 100° C. at about 150–200 mm. pressure. The product was miscible with oil and had an acid number of 25.58. Analyses: Found, 7.1% phosphorus, 3.1% nitrogen, 23.7% chlorine; calculated: 6.9% phosphorus, 3.1% nitrogen and 23.7% chlorine, all percentages being by weight.

*Example III.—Vinyl N,N-dimethylamidotrichloromethanephosphonate*

2-N,N-dimethylamino-1,3,2-dioxaphospholane was prepared by reacting equimolar quantities of 2-chloro-1,3,2-dioxaphospholane and dimethylamine in the presence of ether, as the solvent, and trimethylamine, as the hydrogen chloride acceptor. The reaction mixture was allowed to settle at 0°–5° C. for about 2 hours and was then filtered to remove solid trimethylammoniumchloride. The liquid phase was flashed to remove ether and then topped at 100° C. under vacuum, obtaining as product 2-dimethylamino-1,3,2-dioxaphospholane. The resulting product was heated to about 150° C., and an equimolar amount of carbon tetrachloride was slowly added thereto. The addition of carbon tetrachloride took about 2 hours. The mixture was topped at 100° C. at 150–200 mm. pressure and then fractionated, the product boiling at about 100–105° C. at about 0.5 mm. pressure. Analysis of the product: Found, 11.9% phosphorus, 6.33% nitrogen, 40.3% chlorine; calculated, 12.2% phosphorus, 5.55% nitrogen, 42.2% chlorine.

*Example IV.—Vinyl N,N-diphenylamidotrichloromethanephosphonate*

2 - N,N - diphenylamino - 1,3,2 - dioxaphospholane was heated to about 145° C., and an equimolar amount of carbon tetrachloride was slowly added thereto over a period of about 2½ hours. The mixture was topped at 100° C. at 150–200 mm. pressure, obtaining as product vinyl N,N-diphenylamidotrichloromethanephosphonate.

*Example V.—Vinyl N-hexyl, N-methylamidotrichloromethanephosphonate*

2-N-hexyl, N-methylamino-1,3,2-dioxaphospholane was heated to about 160° C. and an equimolar amount of carbon tetrachloride was slowly added thereto over a period of about 1½ hours. The mixture was topped at 100° C. at about 150 mm. pressure, obtaining as product vinyl N - hexyl, N - methylamidotrichloromethanephosphonate.

*Example VI.—1-propenyl N,N-dimethylamidotribromomethanephosphonate*

2-N,N-dimethylamino-5-methyl-1,3,2-dioxaphospholane was heated to about 150° C. and an equimolar amount of carbon tetrabromide was slowly added thereto over a period of about 2 hours. The product obtained was 1-propenyl N,N - dimethylamidotribromomethanephosphonate.

Example VII.—3-methyl-1-butenyl N,N-diisopropylamidotrichloromethanephosphonate 2-N,N - diisopropylamino-5-isopropyl-1,3,2-dioxaphospholane was heated to about 155° C. and an equimolar amount of carbon tetrachloride was slowly added thereto over a period of about 2 hours. The product obtained was 3-methyl-1-butenyl N,N - diisopropylamidotrichloromethanephosphonate.

Example VIII.—Methyl N-methylamidotrichloromethanephosphonate

Dimethyl N-methylamidophosphite was added, over a period of about 1 hour and with stirring, to excess carbon tetrachloride at a temperature of about 0° C. Stirring was continued at 0° C. for about 1 hour. The mixture was then refluxed for about 10 hours and then stripped to remove methyl chloride and excess carbon tetrachloride. The bottoms were passed through a molecular still, obtaining as product methyl N-methylamidotrichloromethanephosphonate.

Example IX.—Propyl N,N-bis(2-ethylhexyl)amidotrichloromethanephosphonate

Dipropyl N,N-bis(2-ethylhexyl)amidophosphite was added, over a period of about 1 hour and with stirring, to excess carbon tetrachloride at a temperature of about 0° C. Stirring was continued at 0° C. for about 1 hour. The mixture was refluxed for about 12 hours and then stripped to remove propyl chloride and excess carbon tetrachloride. The bottoms were passed through a molecular still, obtaining as product propyl N,N-bis(2-ethylhexyl)-amidotrichloromethanephosphonate.

Example X.—Phenyl N,N-dicetylamidotribromomethanephosphonate

Diphenyl N,N-dicetylamidophosphite was added, over a period of about 1 hour and with stirring, to excess carbon tetrabromide at a temperature of about 0° C. Stirring was continued at 0° C. for about 1 hour, after which the mixture was refluxed for about 12 hours and then stripped to remove bromobenzene and excess carbon tetrabromide. The bottoms were passed through a molecular still, obtaining as product phenyl N,N-dicetylamidotrichloromethanephosphonate.

Example XI.—Isobutyl N-methallylamidotrichloromethanephosphonate

Diisobutyl N-methallylamidophosphite was added, over a period of about 1 hour and with stirring, to excess carbon tetrachloride at a temperature of about 0° C. Stirring was continued at 0° C. for about 1 hour, after which the mixture was refluxed for about 12 hours and then stripped to remove isobutyl chloride and excess carbon tetrachloride. The bottoms were passed through a molecular still, obtaining as product, isobutyl N-methallylamidotrichloromethanephosphonate.

Example XII.—Butyl N-ethanolamidotrichloromethanephosphonate

Dibutyl N-ethanolamidophosphite was added, over a period of about 1 hour and with stirring, to excess carbon tetrachloride at a temperature of about 0° C. Stirring was continued at 0° C. for about 1 hour, after which the mixture was refluxed for about 12 hours and then stripped to remove butyl chloride and excess carbon tetrachloride. The bottoms were passed through a molecular still, obtaining as product, butyl N-ethanolamidotrichloromethanephosphonate.

Example XIII.—Octyl N,N-dicyclohexylamidotrichloromethanephosphonate

Dioctyl N,N-dicyclohexylamidophosphite was added, over a period of about 1 hour and with stirring, to excess carbon tetrachloride at a temperature of about 0° C. Stirring was continued at 0° C. for about 1 hour, after which the mixture was refluxed for about 10 hours and then stripped to remove octyl chloride and excess carbon tetrachloride. The bottoms were passed through a molecular still, obtaining as product, octyl N,N-dicyclohexylamidotrichloromethanephosphonate.

We claim as our invention:

1. n-Butyl, N,N - diisopropylamidotrichloromethanephosphonate.
2. Vinyl N,N - bis(2 - ethylhexyl)amidotrichloromethanephosphonate.
3. Vinyl N,N-dimethylamidotrichloromethanephosphonate.
4. Methyl N - methylamidotrichloromethanephosphonate.
5. 1-propenyl N,N - dimethylamidotribromomethanephosphonate.
6. A vinyl alkylamido trichloromethanephosphonate in which the alkylamido group contains less than 40 carbon atoms.
7. An amide of a vinyl trihalomethanephosphonate.
8. An alkyl amide of an aliphatic ester of a trihalomethanephosphonic acid.
9. A monoamide of an organic monoester of a dibasic acid of pentavalent phosphorus having directly substituted on pentavalent phosphorus a trihalomethyl group.
10. A method of preparing vinyl N,N-bis(2-ethylhexyl)amidotrichloromethanephosphonate which comprises reacting 2-N,N-bis(2-ethylhexyl)amino-1,3,2-dioxaphospholane with carbon tetrachloride at a temperature of from about 125° to about 180° C.
11. A method of preparing vinyl N,N-dimethylamidotrichloromethanephosphonate which comprises reacting 2-N,N-dimethylamino-1,3,2-dioxaphospholane with carbon tetrachloride at a temperature of from about 125° to about 180° C.
12. A method of preparing a vinyl alkylamido trihalomethanephosphonate in which the alkylamido radical contains less than 40 carbon atoms, which comprises reacting a 2-alkylamino-1,3,2-dioxaphospholane, the alkylamino radical corresponding to said alkylamido radical, with a carbon tetrahalide.
13. A method of preparing an amide of a vinyl trihalomethanephosphonate which comprises reacting a P-aminophospholane with a carbon tetrahalide.
14. A method of preparing a monoamide of a vinyl monoester of a dibasic acid of pentavalent phosphorus having directly substituted on pentavalent phosphorus a trihalomethyl group, which comprises reacting a P-aminophospholane with a carbon tetrahalide.
15. A method of preparing n-butyl N,N-diisopropylamidotrichloromethanephosphonate which comprises reacting di-n-butyl N,N-diisopropylamidophosphite with carbon tetrachloride.
16. A method of preparing an alkyl amide of a trihalomethanephosphonate aliphatic monoester which comprises reacting an alkylamidophosphite aliphatic diester with a carbon tetrahalide.
17. A method of preparing a monoamide of a trihalomethanephosphonate organic monoester which comprises reacting a monoamidophosphite organic diester with a carbon tetrahalide.
18. A method of preparing a monoamide of a trihalomethanephosphonate organic monoester which comprises reacting a monoamide of an organic diester of a tribasic acid of trivalent phosphorus with a carbon tetrahalide.

References Cited in the file of this patent

UNITED STATES PATENTS 2,674,616    Morris    Apr. 6, 1954

OTHER REFERENCES

Kamai, Chem. Abst. v. 41, page 5863; 1947.